US012650174B2

(12) United States Patent
Hagbi et al.

(10) Patent No.: US 12,650,174 B2
(45) Date of Patent: Jun. 9, 2026

(54) DIAPHRAGM VALVE INCORPORATING AN ALARM PORT

(71) Applicant: Aquestia Ltd, D.N. Ramat Hagolan (IL)

(72) Inventors: Yeheskiel Hagbi, Moshav Nir-Isreal (IL); Boris Bernstein, Kibbutz Dorot (IL); Assaf Heimann, Moshay Lachish (IL)

(73) Assignee: Aquestia Ltd, D.N. Ramat Hagolan (IL)

( * ) Notice: Subject to any disclaimer, the term of this patent is extended or adjusted under 35 U.S.C. 154(b) by 0 days.

(21) Appl. No.: 18/708,351

(22) PCT Filed: Nov. 10, 2021

(86) PCT No.: PCT/IL2021/051336
§ 371 (c)(1),
(2) Date: May 8, 2024

(87) PCT Pub. No.: WO2023/084507
PCT Pub. Date: May 19, 2023

(65) Prior Publication Data
US 2024/0416165 A1 Dec. 19, 2024

(51) Int. Cl.
| F16K 7/12 | (2006.01) |
| F16K 11/02 | (2006.01) |
| F16K 27/02 | (2006.01) |
| F16K 31/126 | (2006.01) |

(52) U.S. Cl.
CPC ............ F16K 7/126 (2013.01); F16K 11/022 (2013.01); F16K 27/0236 (2013.01); F16K 31/1266 (2013.01)

(58) Field of Classification Search
CPC .. F16K 7/0126; F16K 11/022; F16K 31/1266; F16K 27/0236
See application file for complete search history.

(56) References Cited

U.S. PATENT DOCUMENTS

| 1,630,783 | A | 5/1927 | Clark |
| 1,913,027 | A | 6/1933 | Griffith |
| 3,011,758 | A | 12/1961 | Mcfarland |
| 3,055,629 | A | 9/1962 | Jurs et al. |
| 3,148,254 | A | 9/1964 | Clason |
| 3,412,974 | A | 11/1968 | John |
| 3,448,442 | A | 6/1969 | Hube |
| 3,501,605 | A | 3/1970 | Hutchinson et al. |

(Continued)

FOREIGN PATENT DOCUMENTS

| BR | 9300961 A | 11/1993 |
| CN | 104455539 A | 3/2015 |

(Continued)

*Primary Examiner* — Umashankar Venkatesan
(74) *Attorney, Agent, or Firm* — Ballard Spahr LLP

(57) ABSTRACT
A weir-type diaphragm valve operable to selectively enable liquid flow between two pipelines while directing a portion of the flowing liquid to an external pipeline. The valve comprising a valve body, comprising a diaphragm chamber with a concave weir having an upper surface with a bottom vertex, and an alarm port for enabling liquid communication between said diaphragm chamber and an exterior of the valve body to which the external pipeline is to be connected.

19 Claims, 4 Drawing Sheets

(56)  References Cited

U.S. PATENT DOCUMENTS

| | | | |
|---|---|---|---|
| 3,729,604 A | | 4/1973 | Groff et al. |
| 3,802,462 A | | 4/1974 | Trosch |
| 3,845,259 A | | 10/1974 | Spurr |
| 4,068,712 A | | 1/1978 | Stump |
| 4,072,292 A | | 2/1978 | Banon |
| 4,074,097 A | | 2/1978 | Hutchinson et al. |
| 4,140,045 A | | 2/1979 | Hardwick et al. |
| 4,316,482 A | | 2/1982 | Pearce et al. |
| 4,319,737 A | | 3/1982 | Waterfield |
| 4,614,122 A | | 9/1986 | Graves |
| 4,785,844 A | | 11/1988 | Pankov |
| 4,945,344 A | | 7/1990 | Farrell et al. |
| 5,383,646 A | | 1/1995 | Weingarten |
| 5,520,209 A | | 5/1996 | Goins et al. |
| 5,645,264 A | | 7/1997 | Kah |
| 5,706,859 A | | 1/1998 | Baecklund |
| 6,095,484 A | | 8/2000 | Frenkel |
| 6,216,731 B1 | | 4/2001 | Frenkel |
| 6,283,950 B1 | | 9/2001 | Appling |
| 6,752,376 B1 | | 6/2004 | Satou et al. |
| 7,059,578 B2 * | | 6/2006 | Frenkel ................ F16K 31/145 |
| | | | 92/130 B |
| 7,134,448 B2 | | 11/2006 | Palle |
| 7,527,241 B2 * | | 5/2009 | Lodolo ................ F16K 15/144 |
| | | | 137/859 |
| 7,980,531 B2 | | 7/2011 | Myhrberg et al. |
| 8,051,915 B2 | | 11/2011 | Blease et al. |
| 8,596,295 B2 | | 12/2013 | Colpan et al. |
| 8,616,234 B2 | | 12/2013 | Ringer et al. |
| 8,794,595 B2 | | 8/2014 | Reed et al. |
| 8,851,195 B2 | | 10/2014 | Deurloo |
| 9,046,180 B2 | | 6/2015 | Matalon |
| 9,500,283 B1 | | 11/2016 | Price et al. |
| 9,574,673 B2 | | 2/2017 | Ringer |
| 9,587,750 B2 | | 3/2017 | Ringer et al. |
| 9,657,849 B2 | | 5/2017 | Ringer et al. |
| 9,803,755 B2 | | 10/2017 | Weingarten |
| 9,933,076 B2 | | 4/2018 | Ringer et al. |
| 10,082,212 B2 | | 9/2018 | Ringer et al. |
| 10,471,287 B2 * | | 11/2019 | Williams ............. A62C 35/605 |
| 10,561,874 B2 * | | 2/2020 | Williams ................ F16K 31/02 |
| 10,774,940 B2 * | | 9/2020 | Naor ........................ F16K 7/126 |
| 11,137,080 B2 * | | 10/2021 | Williams ................. F16K 7/17 |
| 11,794,047 B2 | | 10/2023 | Workman et al. |
| 12,209,684 B2 | | 1/2025 | Hagbi et al. |
| 2003/0098073 A1 | | 5/2003 | Jannotta |
| 2005/0155777 A1 | | 7/2005 | Reilly et al. |
| 2005/0205815 A1 | | 9/2005 | Frenkel |
| 2010/0071776 A1 | | 3/2010 | Ringer et al. |
| 2011/0203685 A1 | | 8/2011 | Lin et al. |
| 2011/0297255 A1 | | 12/2011 | Weingarten |
| 2014/0061525 A1 | | 3/2014 | Matalon |
| 2019/0257438 A1 | | 8/2019 | Naor et al. |
| 2020/0011436 A1 | | 1/2020 | Williams |
| 2021/0341066 A1 | | 11/2021 | Ringer et al. |

FOREIGN PATENT DOCUMENTS

| | | |
|---|---|---|
| CN | 206001042 U | 3/2017 |
| CN | 106885011 A | 6/2017 |
| DE | 102017102425 A1 | 8/2018 |
| DE | 102020100745 A1 | 7/2021 |
| EP | 0452374 A1 | 10/1991 |
| EP | 0571850 A1 | 12/1993 |
| EP | 1406023 A2 | 4/2004 |
| EP | 2861901 A1 | 4/2015 |
| FR | 2442388 A1 | 6/1980 |
| GB | 801448 A | 9/1958 |
| GB | 808074 A | 1/1959 |
| GB | 868278 A | 5/1961 |
| GB | 917719 A | 2/1963 |
| GB | 926129 A | 5/1963 |
| GB | 992576 A | 5/1965 |
| KR | 20090010276 U | 10/2009 |
| KR | 101285294 B1 | 7/2013 |
| WO | 9837344 A1 | 8/1998 |

* cited by examiner

DIAPHRAGM VALVE INCORPORATING AN ALARM PORT

TECHNOLOGICAL FIELD

The present invention relates to weir-type diaphragm valves having a port for directing liquid flowing therethrough to an external system, such as a fire extinguishing system.

BACKGROUND ART

References considered to be relevant as background to the presently disclosed subject matter are listed below:
U.S. Ser. No. 10/082,212B2; and
U.S. Pat. No. 5,706,859A
Acknowledgement of the above references herein is not to be inferred as meaning that these are in any way relevant to the patentability of the presently disclosed subject matter.

BACKGROUND

The present invention relates to direct-sealing diaphragm valves, and particularly to hydraulic-actuated, pilot-operated, direct sealing diaphragm valves for use with a fire extinguishing system, such as deluge, pre-action or wet-pipe sprinkler systems, incorporating a hydraulically operated alarm arrangement.

The valves in their ready state form a barrier between an upstream pipeline and a downstream pipeline. The valves should seal the water passage between the pipelines, and provide means for early alert in case the valve opens even slightly.

The valves in such systems are typically normally closed, preventing water passage therethrough until being triggered by a pilot arrangement.

Such valves typically include an alarm drain for directing liquid to an alarm arrangement, and are controlled by a diaphragm which during operation is exposed to high internal pressure conditions and as a result, may suffer distortion.

GENERAL DESCRIPTION

According to the presently disclosed subject matter, there is provided a weir-type diaphragm valve operable to selectively enable liquid flow between two pipelines while directing a portion of the flowing liquid to an external pipeline, said valve comprising:

a valve body comprising:
    a diaphragm chamber with a concave weir extending across said chamber and having an upper surface with a bottom vertex; and
    an alarm port for enabling liquid communication between said diaphragm chamber and an exterior of the valve body to which said external pipeline is configured to be connected; and
a diaphragm being deformable within said diaphragm chamber between a closed state in which a sealing surface of the diaphragm covers a resting portion of the diaphragm chamber including said upper surface of the weir, thereby preventing liquid from flowing between said pipelines, and an open state in which said sealing surface is spaced at least from said bottom vertex, thereby enabling liquid to flow between said pipelines; wherein said alarm port is entirely formed on said resting portion, spaced from said bottom vertex, so as to be sealed by said sealing surface of said diaphragm in said closed state, and be unsealed thereby in said open state.

The diaphragm can comprise a circumferential section fixedly held by said valve body, a concave central relatively rigid rigidified section having a first bendability, and a relatively less rigid peripheral section extending between said circumferential section and said central rigidified section and having a second bendability greater than said first bendability, and wherein said alarm port is formed on said resting portion such that in said closed state, said alarm port faces and is sealed by a sealing portion of said sealing surface associated with said peripheral section of the diaphragm.

During switching of said diaphragm between said open and closed states, said central rigidified section can maintain its shape and said peripheral section can deform to facilitate said switching.

The sealing portion can be disposed at an area of said peripheral section closer to said circumferential section than to said central rigidified section.

The peripheral section can comprise an array of biasing ribs for supporting deformation of the diaphragm from said open state to said closed state, radially arranged along a strip of said peripheral section; and wherein said sealing portion can be disposed at said strip.

The diaphragm can be hydraulically operated by means of hydraulic pressure gradient between a lower surface and an opposite upper surface of the diaphragm.

During switching of the diaphragm from its closed state to its open state by means of hydraulic pressure, the sealing portion can disengage from the alarm port before a center of said central section disengages from said bottom vertex of the upper surface of said weir.

The diaphragm chamber can have a longitudinal plane spanning across and normal to said bottom vertex of the upper surface of the weir, and wherein said alarm port is entirely formed outside said longitudinal plane.

The diaphragm chamber can have a lateral plane spanning along said upper surface of said weir such that the lateral plane borders between an upstream side of said diaphragm chamber and a downstream side of said diaphragm chamber, and wherein said alarm port is entirely formed outside said lateral plane.

The alarm port can be entirely formed at said downstream side of said diaphragm chamber.

The lateral plane can be perpendicular to said longitudinal plane.

The upper surface of the weir can be defined symmetrically with respect to said lateral plane, and said alarm port can be formed in an auxiliary surface of said resting portion, at least partially outside said upper surface of said weir, yet formed flush therewith, and optionally, completely outside said upper surface of said weir.

The auxiliary surface can be coplanar with said upper surface of said weir.

The upper surface of said weir can be defined between two parallel edges of said weir, symmetrically arranged with respect to said lateral plane, and wherein said auxiliary surface of said resting portion extends from one of those edges which is closer to said downstream side of said diaphragm chamber.

The auxiliary surface can protrude from a sidewall of said diaphragm chamber into the diaphragm chamber, at said downstream side of the diaphragm chamber.

The auxiliary surface can be supported by a bulge of the valve body having a first surface facing said upstream side of said diaphragm chamber, constituting said auxiliary surface, and a second surface facing said downstream side of said diaphragm chamber, being substantially parallel to said longitudinal plane.

In operation of the valve, in the closed state of the diaphragm, the upstream side of the diaphragm chamber can hold liquid, while said downstream side of the diaphragm chamber can holds gas.

The sealing surface can have a concave shape corresponding to a concave shape of the upper surface of said concave weir, and wherein in said open state, a vertex of said sealing surface is spaced from said bottom vertex of said upper surface of said weir.

The valve can constitute a part of a fire extinguishing system, and said external pipeline can be associated with an alarm arrangement of the fire extinguishing system actuated by liquid flowing through the alarm port.

The valve body can be manufactured by molding, and said alarm port can be bored through the valve body after it has been molded.

The alarm port can be cylindrical, at least at an area thereof closest to said diaphragm chamber.

The alarm port can comprise at least two cylindrical portions having different diameters.

It should be appreciated that due to their geometries, the peripheral section of the diaphragm is more susceptible to distortions than the central section, and particularly, than the bottom vertex of the sealing surface.

Hence, during switching of the diaphragm from the closed state to the open state, under the hydraulic forces generated at the area of the sealing surface, the peripheral section of the diaphragm is first to be breached by the liquid flowing between the inlet and the outlet, i.e., the first to disengage from a respective part of the resting portion with which it was in sealing contact, while the central section, and particularly, the bottom vertex is last to do be disengaged.

Furthermore, in some operations of the valve, the central portion does not disengage from the resting portion at all.

The positioning of the alarm port within the diaphragm chamber, and particularly, the positioning of its rim should enable the valve to provide liquid to the alarm port as soon as possible to provision of liquid to the "dry" pipeline, i.e., to the outlet. The alarm port is formed such that it opens out into the chamber at a position normally sealed by the peripheral section, so as to receive liquid as soon as liquid begins to unseal the diaphragm. Generally, the alarm port is formed such that it faces an area distal from the central section, or at least distal from the bottom vertex of the sealing surface, when the diaphragm is in its closed state. Namely, the sealing portion covering the alarm port is disposed at an area of the sealing surface associated with the peripheral section, distal from the central section, distal from the bottom vertex, and more particularly, at the peripheral section in a location closer to the circumferential section than to the central section.

With such arrangement, the valve provides means for early alert, i.e., means for directing liquid immediately to the alarm port, in the event that the diaphragm opens even slightly.

It should also be appreciated that the central section, being more distal to the fixed circumferential section than the peripheral section, is more susceptible to movements than the peripheral section. As close as the sealing portion is closer to the circumferential section the less susceptible it is to accidently unsealing the alarm port due to drifting/rolling of the diaphragm from the resting portion.

The alarm port comprises at least a narrow and a wide cylindrical portions, respectively, having different diameters. The narrow portion being proximal to the diaphragm chamber and including the rim, thereby allowing sealing thereof to be performed easily, also in cases where the diaphragm not evenly seats on the resting portion. The wide portion being proximal to the exterior of the valve body, to enable easy handling therewith, e.g., connecting the external pipe of the fire extinguishing system thereinto.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
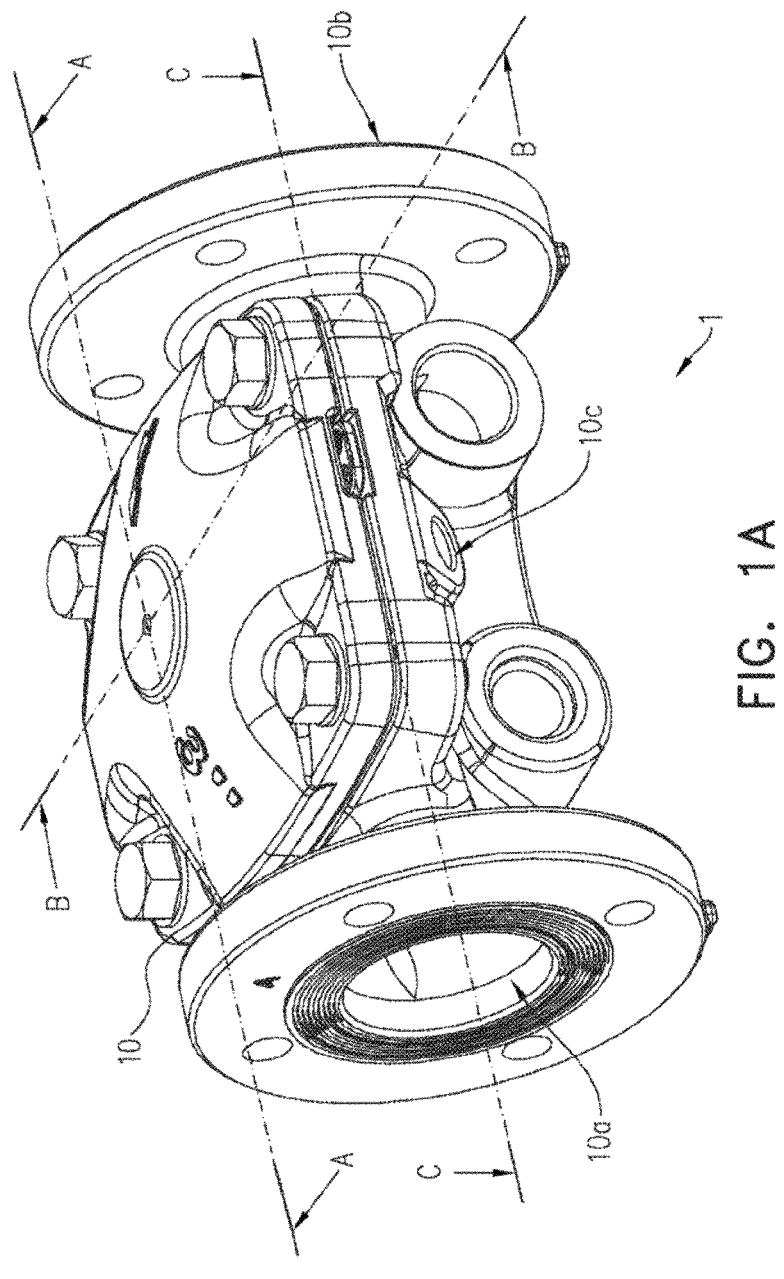
FIG. 1A is a top perspective view of a weir-type diaphragm valve according to an example of the presently disclosed subject matter.
Figure 1B:
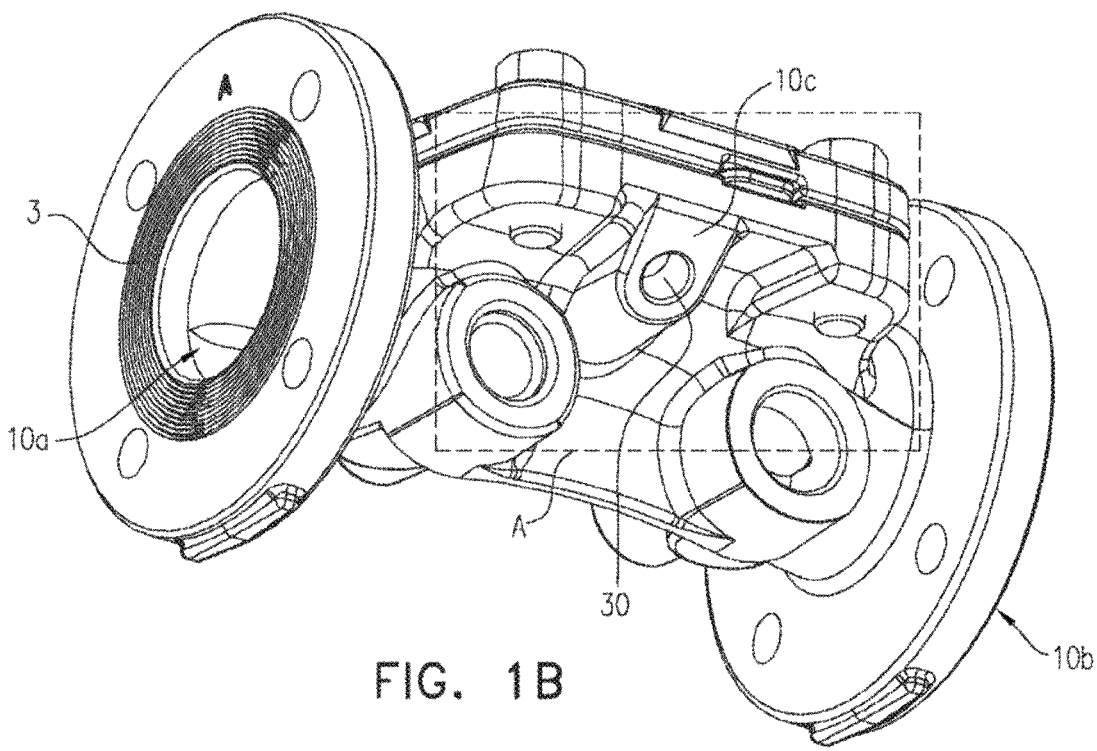
FIG. 1B is a bottom perspective view of the valve of FIG. 1A.
Figure 1C:
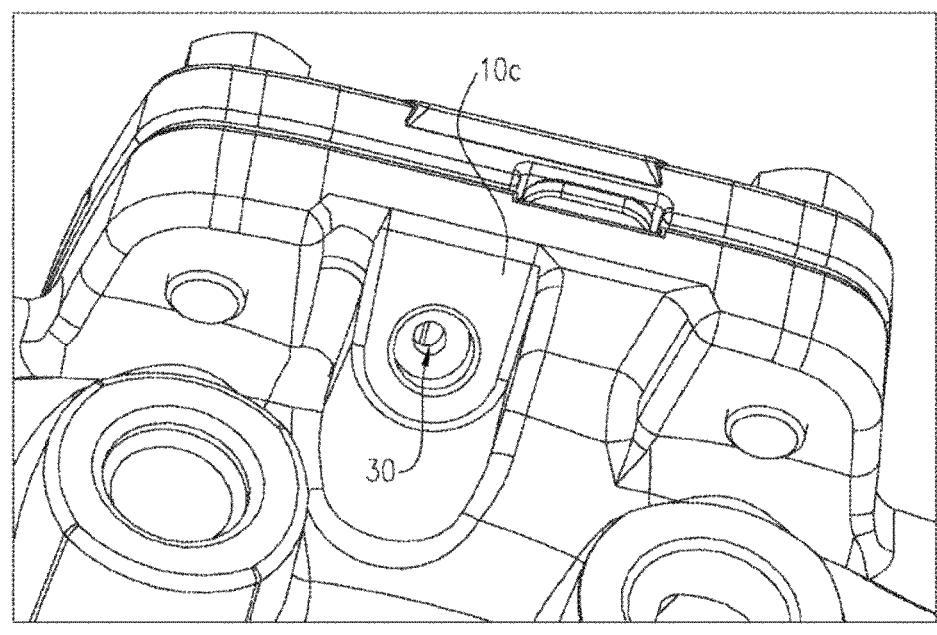
FIG. 1C is a close up view of area A in FIG. 1B.

Attention is first directed to FIGS. 1A to 1C of the drawings illustrating a weir-type diaphragm valve 1 according to one example of the presently disclosed subject matter.

The valve 1 is configured for use with a fire extinguishing system, to selectively enable liquid flow between two pipelines of the fire extinguishing system.

In particular, the valve 1 is a normally closed valve preventing liquid flow between the pipelines, and is configured to be opened, i.e., to enable liquid flow therethrough, upon detection of a fire by the fire extinguishing system.

The fire extinguishing system can include a "dry" pipeline, which typically accommodates dry components such as gasses, and particularly air, deployed across an area in which fire should be extinguished, and a "wet" pipeline, which typically accommodates pressurized or unpressurized liquid ready to be provided to the "dry" pipeline to extinguish the fire once the valve 1 is opened to enable liquid flow therethrough between the pipelines.

In some configurations of the present example, the "dry" pipeline is provided with an array of normally open sprinklers, ready to spray out liquid when the latter passes through the valve 1 from the "wet" pipeline to the "dry" one.

In other embodiments, both pipelines can be "wet", i.e., accommodate liquid, optionally, at different pressure levels. In particular, the so called "dry" pipeline can accommodate liquid at a first pressure level, and the so called "wet" pipeline can accommodate liquid at a second pressure level greater than the first pressure level.

Attention is further directed towards FIGS. 2A to 2D of the drawings illustrating cross sectional views of the valve 1.

The valve 1 comprises a valve body 10 comprising an inlet 10a connectable to a first pipeline of the fire extinguishing system (not illustrated), namely, the "wet" pipeline, and an outlet 10b connectable to a second pipeline of the fire extinguishing system (not illustrated), namely, the "dry" pipeline.

As can be understood, the first and second pipelines can be connected to the inlet 10a and the outlet 10b of the valve 1, respectively, optionally by means of a thread 3 formed at each of the inlet 10a and the outlet 10b, such that the valve 1 is disposed therebetween.

The valve 1 is switchable between a flow preventing state in which flow is prevented between the inlet 10a and the outlet 10b, and a flow enabling state in which flow is enabled between the inlet 10a and the outlet 10b, thereby enabling flow of fluid from the "wet" pipeline to the "dry" pipeline.

The valve 1 as described in the present example is a hydraulically operated valve, and optionally a pilot operated valve, formed with a diaphragm chamber 11 disposed between the valve inlet 10a and the valve outlet 10b. Accommodated within the diaphragm chamber 11 is a deformable diaphragm 20 arranged above a weir 13 of the valve body 10 and beneath a selectively pressurized control chamber 5 of the valve body 10. The control chamber 5 is configured to be pressurized as long as the valve 1 should remain closed, and de-pressurized upon detection of fire by a fire sensitive pilot arrangement (not illustrated) to cause the diaphragm 20 to deform with respect to the weir 13, between a closed state of the diaphragm, in which the diaphragm covers, or engages, the weir 13, shown in FIG. 2A, corresponding to the flow preventing state of the valve 1, and an open state, shown in FIG. 2B, in which the diaphragm 20 is spaced from, or distal from, the weir 13, corresponding to the flow enabling state of the valve 1.

Figure 2A:
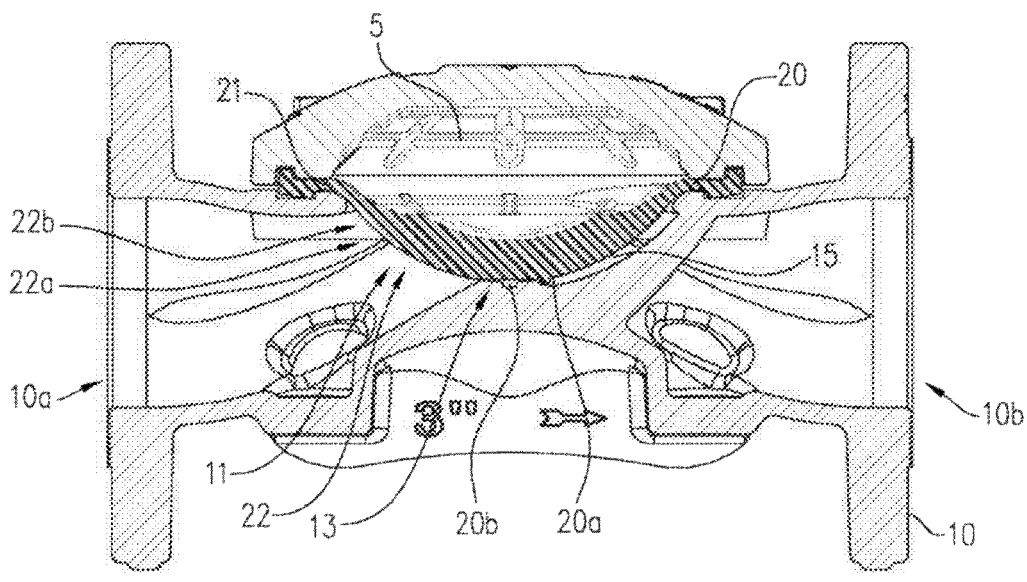
FIG. 2A is a cross-sectional side view of the valve of FIG. 1A taken along line A-A, in a flow preventing state, with the diaphragm of the valve in its closed state.
Figure 2B:
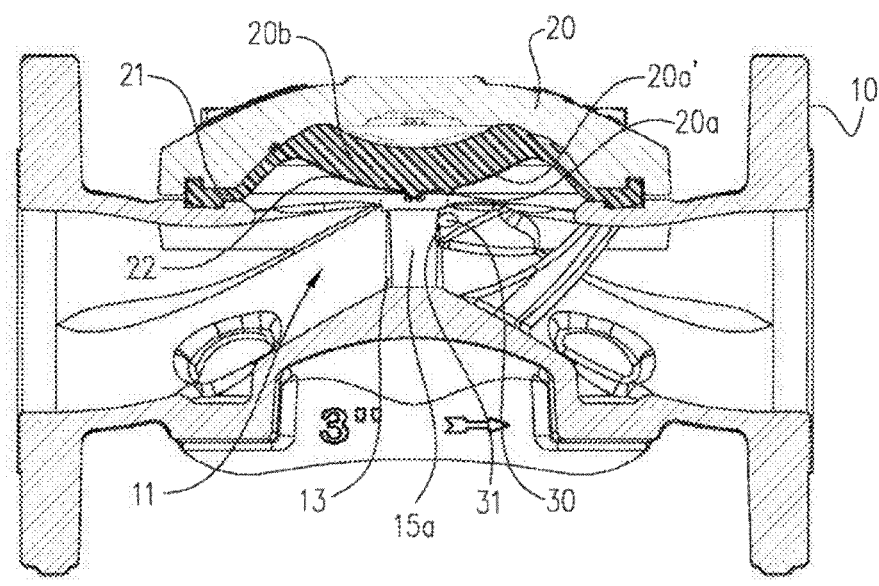
FIG. 2B illustrates the cross-sectional side view of the valve of FIG. 1A taken along line A-A, in a flow enabling state, with the diaphragm in its open state.

As shown in FIG. 2B, the diaphragm 20 is in an uppermost state, in which the diaphragm 20 is furthest from the weir 13, and liquid flow between the inlet 10a and the outlet 10b is enabled to a maximum extent. It should be appreciated that the term "open state" of the diaphragm 20 and/or the term "flow enabling state" of the valve 1, as presented in the present disclosure, also correspond to states of the diaphragm 20 in which flow is enabled to a lesser extent than maximum, and particularly, to every state of the diaphragm 20 in which flow is not entirely prevented.

Other than the aforementioned first and second pipelines, the fire extinguishing system can also include an alarm arrangement operable upon the detection of a fire, to notify any individual in the vicinity of the fire about the existence of the fire.

The alarm arrangement can be a hydraulically operated alarm arrangement configured to use some of the liquid flowing through the valve 1 from the "wet" pipeline to the "dry" pipeline upon the detection of a fire, to operate as soon as, and even before, the fire begins to be extinguished.

Figure 2C:
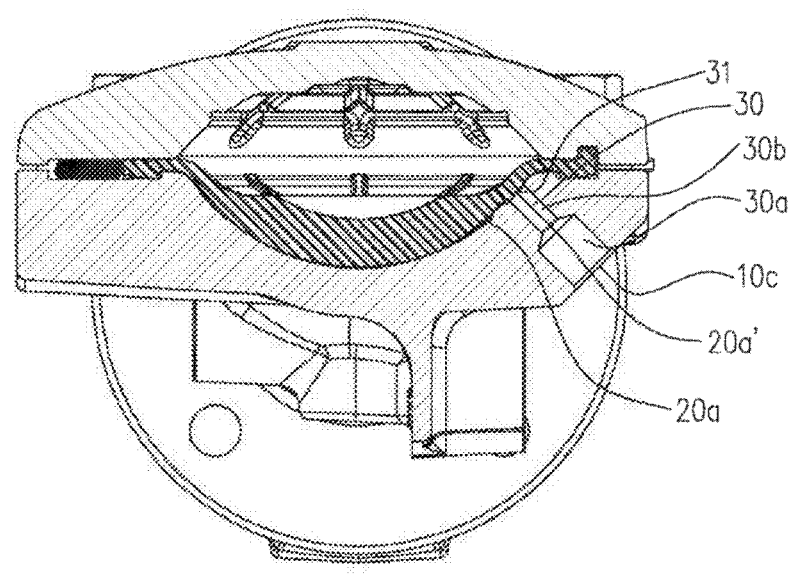
FIG. 2C is a cross-sectional side view of the valve of FIG. 1A taken along line B-B, in a flow preventing state, with the diaphragm of the valve in its closed state.

To provide some of the liquid flowing through the valve 1 to the alarm arrangement, the valve body 10 is further provided with an alarm port 30, best seen in FIG. 2C, extending between the diaphragm chamber 11 and an exterior 10c of the valve body 10 to which an external pipeline (not illustrated) of the alarm arrangement is to be connected, thereby enabling liquid communication between the diaphragm chamber 11 and the exterior 10c of the valve body 10, when the diaphragm 20 is in its open state, as will be explained hereinafter.

During an emergency, i.e., when fire breaks out within an area in which the "dry" pipeline is deployed, the valve 1 provides liquid from the "wet" pipeline, i.e., from the inlet

10a thereof, to both the "dry" pipeline, i.e., to the outlet 10b thereof, for extinguishing the fire, and to the alarm arrangement, i.e., the alarm port 30, for actuating the alarm.

To prevent liquid from entering the alarm port 30 at other times in which there is no fire to be extinguished, and to prevent the alarm port 30 from becoming clogged when not in use, the alarm port 30 is positioned in the diaphragm chamber 11 such that it is sealingly covered by the diaphragm 20 when the latter is in its closed state.

As can be seen in FIG. 2A, when the diaphragm 20 is in its closed state, the diaphragm 20 rests on a resting portion 15 of the diaphragm chamber 11, and the alarm port 30 is formed at that resting portion.

The resting portion 15 includes, and is limited to, every portion of the diaphragm chamber 11 being in contact with the diaphragm 20 in the closed state thereof, and particularly, in contact with a lower concave sealing surface 20a of the diaphragm 20.

The lower concave sealing surface 20a includes a sealing portion 20a' configured to sealingly cover a rim 31 of the alarm port 30 facing the diaphragm chamber 11, when the diaphragm 20 is in its closed state.

The sealing portion 20a', and even the entire sealing surface 20a, can be made of resilient material, e.g., that of which the entire diaphragm 20 is made, configured to facilitate sealing of the alarm port 30 by its rim 31, in the closed state of the diaphragm 20.

In some examples, pressure within the control chamber 5 of the diaphragm chamber 11 can induce minor deformation of the sealing portion 20a' beyond the rim 31, into the alarm port 30, to enhance the sealing thereof.

As can be seen in FIG. 2B, at the uppermost state of the diaphragm 20, the sealing surface 20a of the diaphragm 20, including the sealing portion 20a', is spaced from the resting portion 15, thereby unsealing the alarm port 30, and enabling liquid flow thereinto while the liquid flows from the inlet 10a to the outlet 10b.

One of the portions of the diaphragm chamber 11 included in the resting portion 15 of the present example is an upper face 15a of the weir 13, which herein is concave shaped, corresponding to the shape of the sealing surface 20a of the diaphragm 20.

It should be appreciated that in most cases, and particularly in cases where the valve 1 is a hydraulically operated valve (as in the present example), in which the diaphragm is operated by means of hydraulic pressure gradient between a lower surface and an opposite upper surface thereof, the switching between the closed and open states of the diaphragm occurs gradually, and the unsealing of the alarm port 30 by the sealing portion 20a' takes place at some point during that process of switching.

To better understand the gradual switching, the diaphragm 20 can be divided into sections, namely, a circumferential section 21 fixedly held by the valve body 10, and an inner section 22 deformable with respect to the circumferential section 21, as described above, to achieve the open and closed states of the diaphragm 20. The inner section 22 can be further divided into a central section 22a including, and sometimes limited to, a bottom vertex 20b of the sealing surface 20a, and a peripheral section 22b extending between the circumferential section 21 and the central section 22a.

It should be appreciated that due to their geometries, the peripheral section 22b of the diaphragm 20 is more susceptible to distortions than the central section 22a, and particularly, than the bottom vertex 20b of the sealing surface 20a.

Hence, during switching of the diaphragm 20 from the closed state to the open state, under the hydraulic forces generated at the area of the sealing surface 20a, the peripheral section 22b of the diaphragm is first to be breached by the liquid flowing between the inlet 10a and the outlet 10b, i.e., the first to disengage from a respective part of the resting portion 15 with which it was in sealing contact, while the central section 22a, and particularly, the bottom vertex 20b is last to do be disengaged.

Furthermore, in some operations of the valve 1, the central portion 22a does not disengage from the resting portion 15 at all.

In order to provide liquid to the alarm port 30 as soon as possible to provision of liquid to the "dry" pipeline, i.e., to the outlet 10b, the alarm port 30 is formed such that it opens out into the chamber 11 at a position normally sealed by the peripheral section 22b, so as to receive liquid as soon as liquid begins to unseal the diaphragm 20. Generally, the alarm port 30 is formed such that it faces an area distal from the central section 22a, or at least distal from the bottom vertex 20b of the sealing surface 20a, when the diaphragm 20 is in its closed state. namely, the sealing portion 20a' covering the alarm port 30 is disposed at an area of the sealing surface 20a associated with the peripheral section 22b, distal from the central section 22a, distal from the bottom vertex 22b, and more particularly, at the peripheral section 22b in a location closer to the circumferential section 21 than to the central section 22a.

With such arrangement, the valve 1 provides means for early alert, i.e., means for directing liquid immediately to the alarm port 30, in the event that the diaphragm 20 opens even slightly.

It should also be appreciated that the central section 22a, being more distal to the fixed circumferential section 21 than the peripheral section 22b, is more susceptible to movements than the peripheral section 22b. As close as the sealing portion is closer to the circumferential section 21 the less susceptible it is to accidently unsealing the alarm port 30 due to drifting/rolling of the diaphragm from the resting portion 15.

In the example shown herein, the central section 22a is a relatively rigid central section having a first bendability, and the peripheral section 22b is a relatively less rigid peripheral section having a second bendability greater than the first bendability.

As can be seen in FIG. 2B, the first bendability allows the central section 22a to maintain its shape during deformation of the diaphragm 20 between the closed and open states, while the second bendability of the peripheral section 22b permits deformation thereof to facilitate switching between the closed and open states.

Figure 2D:
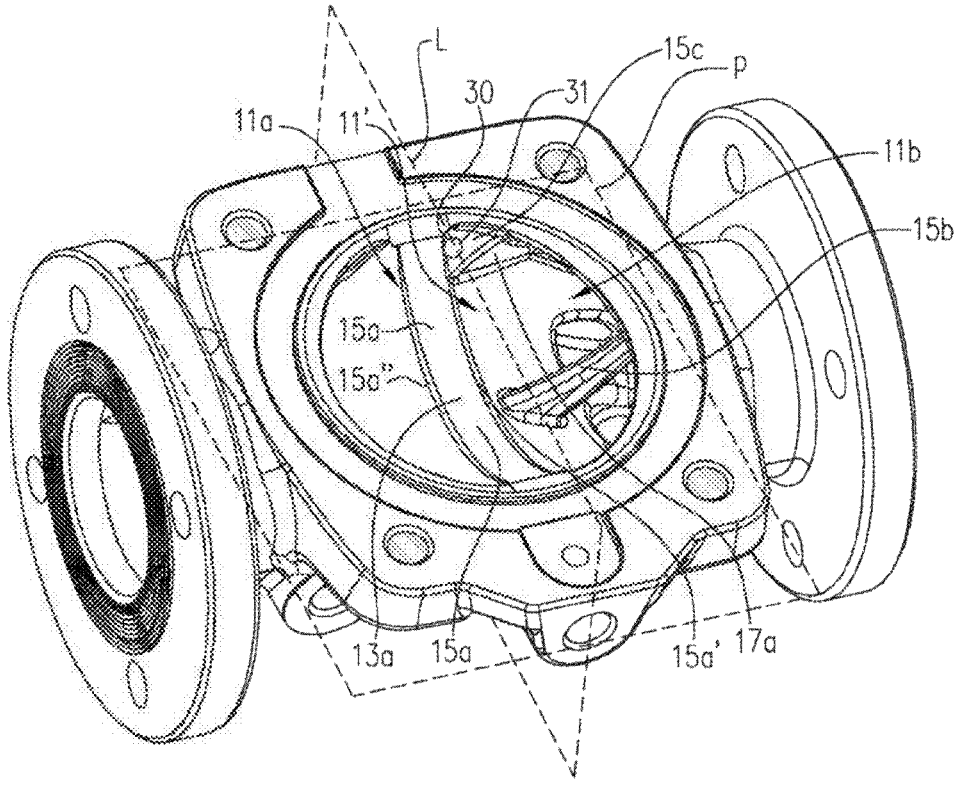
FIG. 2D is a cross-sectional perspective view of the valve of FIG. 1A taken along line C-C, with the diaphragm removed for simplicity purposes.

To further exemplify the location of the alarm port within the diaphragm chamber 11, attention is specifically directed to FIGS. 2C and 2D illustrating a cross-sectional side view of the valve 1 taken along the line B-B shown in FIG. 1A, and a perspective cross-sectional view of the valve 1 taken along line C-C shown in FIG. 1A, shown with the diaphragm 20 removed, respectively.

As can be seen in those figures, a lateral plane L can be defined for the diaphragm chamber 11, spanning along the upper surface 15a of the weir 13 such that the lateral plane L borders between an upstream side 11a of the diaphragm chamber 11, and a downstream side 11b of the diaphragm chamber 11. As can be seen, the alarm port 30, and particularly, the rim 31 thereof, is formed entirely outside of the lateral plane L, at the downstream side 11b of the diaphragm chamber 11. This arrangement allows the alarm port 30 to remain sealed even when the diaphragm 15 rolls or is pushed or biased slightly towards the downstream side 11b of the diaphragm chamber 11. Such pushing or rolling may occur when relatively higher pressure upstream pushes the diaphragm towards relatively lower pressure downstream, and/or when a pressure wave, e.g., a water hammer, impinges on an upstream side of the diaphragm 20.

A longitudinal plane P can also be defined for the diaphragm chamber 11, perpendicularly to the lateral plane L, spanning across and normal to the bottom vertex 13a of the upper surface 15a of the weir 13. As can also be seen, the alarm port 30 is entirely formed outside of the longitudinal plane P, adjacent a sidewall 11' of the diaphragm chamber 11.

It should be appreciated that other than the upper face 15a of the weir 13, the resting portion 15 on which the diaphragm 20 rests in the closed state of the diaphragm 20 also includes an upper face 15b of a support rod extending across the downstream side 11b of the diaphragm chamber 11, and an auxiliary surface 15c of a protrusion protruding from the sidewall 11' of the diaphragm chamber 11 into the downstream side 11b diaphragm chamber 11.

As can be seen, the auxiliary surface 15c extends from the upper surface 15a of the weir 13, and is formed smoothly/coplanar therewith, continuing the concavity of the upper surface 15a to the downstream side 11b of the diaphragm chamber 11, to enable smooth resting of the lower surface 20a of the diaphragm 20, and particularly the sealing portion 20a' thereof, thereon.

Particularly, the upper surface 15a of the weir 13 is bounded by a downstream edge 15a' and an upstream edge 15a", symmetrically disposed with respect to the lateral plane L, and the auxiliary surface 15c extends from the downstream edge 15a', completely outside the upper surface 15a of the weir, such that the rim 31 thereof coincides with the edge 15a'.

The auxiliary surface 15c is supported by a bulge 17 of the valve body 10 protruding from the sidewall 11'. The bulge 17 having a substantially triangular shape with a base constituted by the sidewall 11' of the diaphragm chamber 11, a front surface 17a facing the downstream side 11b of the diaphragm chamber 11 substantially parallel to the longitudinal plane L, and a rear surface, namely, the auxiliary surface 15c, facing the upstream side 11a of the diaphragm chamber 11, on which the port 30 with its rim 31 are formed. Such arrangement allows the diaphragm 20 to bare on the auxiliary surface 15c, and achieve more grip for handling pressure gradients as described, and thereby enhance the sealing of the alarm port 30 when the diaphragm 20 is at its closed state.

As can be best seen in FIG. 2C, the alarm port 30 is in the form of a cylindrical bore formed in the valve body 10. Such arrangement allows the valve body 10 to be manufactured by simple manufacturing techniques such as molding, and the alarm port 30 to be formed retroactively therein, after it has been molded, thereby simplifying the manufacturing process. Such arrangement also allows modifying an existing, traditional valve merely configured to selectively enable liquid flow between its inlet and outlet, to a valve incorporating the alarm port 30.

In fact, the alarm port 30 comprises at least a narrow and a wide cylindrical portions 30a and 30b, respectively, having different diameters. The narrow portion 30b being proximal to the diaphragm chamber 11 and including the rim 31, thereby allowing sealing thereof to be performed easily, also in cases where the diaphragm 20 not evenly seats on the resting portion 15. The wide portion 30b being proximal to the exterior 10a of the valve body, to enable easy handling therewith, e.g., connecting the external pipe of the fire extinguishing system thereinto.

The wide portion 30*b* can be formed with threads, or any other means for rapid and easy connecting of the external pipe thereinto.

The invention claimed is:

1. A weir-type diaphragm valve operable to selectively enable liquid flow between two pipelines while directing a portion of the flowing liquid to an external pipeline, said valve comprising:

a valve body comprising:

a diaphragm chamber with a concave weir extending across said chamber and having an upper surface with a bottom vertex, wherein said diaphragm chamber has a lateral plane spanning along said upper surface of said weir such that it borders between an upstream side of said diaphragm chamber and a downstream side of said diaphragm chamber; and an alarm port for enabling liquid communication between said diaphragm chamber and an exterior of the valve body to which said external pipeline is configured to be connected; and a diaphragm being deformable within said diaphragm chamber between a closed state in which a sealing surface of the diaphragm covers a resting portion of the diaphragm chamber including said upper surface of the weir, thereby preventing liquid from flowing between said pipelines, and an open state in which said sealing surface is spaced at least from said bottom vertex, thereby enabling liquid to flow between said pipelines;

wherein said alarm port is entirely formed on said resting portion and outside said lateral plane, and is spaced from said bottom vertex, so as to be sealed by said sealing surface of said diaphragm at said closed state, and be unsealed thereby at said open state; and wherein said upper surface of said weir is defined symmetrically with respect to said lateral plane, and said alarm port is formed in an auxiliary surface of said resting portion, at least partially outside said upper surface of said weir, yet formed flush therewith.

2. The weir-type diaphragm valve according to claim 1, wherein said diaphragm comprises a circumferential section fixedly held by said valve body, a concave central relatively rigid section having a first bendability, and a peripheral relatively less rigid section extending between said circumferential section and said central rigidified section and having a second bendability greater than said first bendability, and wherein said alarm port is formed on said resting portion such that at said closed state, said alarm port faces and is sealed by a sealing portion of said sealing surface associated with said peripheral section of the diaphragm.

3. The weir-type diaphragm valve according to claim 2, wherein during switching of said diaphragm between said open and closed states, said central rigidified section maintains its shape and said peripheral section deforms to facilitate said switching.

4. The weir-type diaphragm valve according to claim 2, wherein said sealing portion is disposed at an area of said peripheral section closer to said circumferential portion than to said central rigidified section.

5. The weir-type diaphragm valve according to claim 2, wherein said peripheral section comprises an array of biasing ribs for supporting deformation of the diaphragm from said open state to said closed state, radially arranged along a strip of said peripheral section; and wherein said sealing portion is disposed at said strip.

6. The weir-type diaphragm valve according to claim 1, wherein said diaphragm is hydraulically operated by means of hydraulic pressure gradient between a lower surface and an opposite upper surface thereof.

7. The weir-type diaphragm valve according to claim 6, wherein said diaphragm comprises a circumferential section fixedly held by said valve body, a concave central relatively rigid section having a first bendability, and a peripheral relatively less rigid section extending between said circumferential section and said central rigidified section and having a second bendability greater than said first bendability, and wherein said alarm port is formed on said resting portion such that at said closed state, said alarm port faces and is sealed by a sealing portion of said sealing surface associated with said peripheral section of the diaphragm, wherein during switching of the diaphragm from its closed state to its open state by means of hydraulic pressure, said sealing portion disengages from said alarm port before a center of said central section disengages from said bottom vertex of the upper surface of said weir.

8. The weir-type diaphragm valve according to claim 1, wherein said diaphragm chamber has a longitudinal plane spanning across and normal to said bottom vertex of the upper surface of the weir, and wherein said alarm port is entirely formed outside said longitudinal plane.

9. The weir-type diaphragm valve according to claim 1, wherein said alarm port is entirely formed at said downstream side of said diaphragm chamber.

10. The weir-type diaphragm valve according to claim 9, wherein said diaphragm chamber has a longitudinal plane spanning across and normal to said bottom vertex of the upper surface of the weir, and wherein said alarm port is entirely formed outside said longitudinal plane, wherein said lateral plane is perpendicular to said longitudinal plane.

11. The weir-type diaphragm valve according to claim 1, wherein said auxiliary surface is coplanar with said upper surface of said weir.

12. The weir-type diaphragm valve according to claim 1, wherein said upper surface of said weir is defined between by two parallel edges of said weir, symmetrically arranged with respect to said lateral plane, and wherein said auxiliary surface of said resting portion extends from one of those edges which is closer to said downstream side of said diaphragm chamber.

13. The weir-type diaphragm valve according to claim 1, wherein said auxiliary surface protrudes from a sidewall of said diaphragm chamber into the diaphragm chamber, at said downstream side of the diaphragm chamber.

14. The weir-type diaphragm valve according to claim 1, wherein said auxiliary surface is supported by a bulge of said valve body having a first surface facing said upstream side of said diaphragm chamber, constituting said auxiliary surface, and a second surface facing said downstream side of said diaphragm chamber, being substantially parallel to said longitudinal plane.

15. The weir-type diaphragm valve according to claim 1, wherein in operation of the valve, at said closed state of the diaphragm, said upstream side of the diaphragm chamber holds liquid, while said downstream side of the diaphragm chamber holds gas.

16. The weir-type diaphragm valve according to claim 1, wherein said sealing surface has a concave shape corresponding to the concave upper surface of said weir, and wherein at said open state, a vertex of said sealing surface is spaced from said bottom vertex of said upper surface of said weir.

17. The weir-type diaphragm valve according to claim 1, wherein said valve constitutes a part of a fire extinguishing system, and said external pipeline is associated with an alarm arrangement of the fire extinguishing system actuated by liquid flowing through the alarm port.

18. The weir-type diaphragm valve according to claim 1, wherein said valve body is manufactured by molding, and said alarm port is drilled through the valve body after it has been molded.

19. The weir-type diaphragm valve of claim 1, wherein said auxiliary surface is located completely outside said upper surface of said weir.

\*    \*    \*    \*    \*